United States Patent
Phadatare et al.

(10) Patent No.: US 12,525,609 B2
(45) Date of Patent: Jan. 13, 2026

(54) SILICON-NANOGRAPHITE AEROGEL-BASED ANODES FOR BATTERIES

(71) Applicant: GRANODE MATERIALS AB, Sundsvall (SE)

(72) Inventors: Manisha Phadatare, Sundsvall (SE); Rohan Patil, Sundsvall (SE); Håkan Olin, Sundsvall (SE)

(73) Assignee: GRANODE MATERIALS AB, Sundsvall (SE)

( * ) Notice: Subject to any disclaimer, the term of this patent is extended or adjusted under 35 U.S.C. 154(b) by 898 days.

(21) Appl. No.: 17/762,311

(22) PCT Filed: Sep. 23, 2020

(86) PCT No.: PCT/EP2020/076530
§ 371 (c)(1),
(2) Date: Mar. 21, 2022

(87) PCT Pub. No.: WO2021/058541
PCT Pub. Date: Apr. 1, 2021

(65) Prior Publication Data
US 2022/0336798 A1    Oct. 20, 2022

(30) Foreign Application Priority Data
Sep. 23, 2019    (SE) .................... 1951066-8

(51) Int. Cl.
*H01M 4/38*        (2006.01)
*H01M 4/02*        (2006.01)
(Continued)

(52) U.S. Cl.
CPC ........... *H01M 4/386* (2013.01); *H01M 4/133* (2013.01); *H01M 4/1395* (2013.01);
(Continued)

(58) Field of Classification Search
CPC ...... H01M 4/625; H01M 4/133; H01M 4/386; H01M 4/1395; H01M 4/366;
(Continued)

(56) References Cited

U.S. PATENT DOCUMENTS 7,745,047 B2   6/2010   Zhamu et al.
8,795,899 B2   8/2014   Liu et al.
(Continued)

FOREIGN PATENT DOCUMENTS

CN         108258210         7/2018

OTHER PUBLICATIONS

Sehrawat et al., "Recent trends in silicon/graphene nanocomposite anodes for lithium-ion batteries", Journal of Power Sources, 501 (May 20, 2021) 229709, pp. 1-33 (Year: 2021).*

(Continued)

*Primary Examiner* — Holly Rickman
(74) *Attorney, Agent, or Firm* — Branch Partners PLLC; Bruce E. Black

(57) ABSTRACT

The present invention relates to a silicon-nanographite aerogel for use as an anode in a battery, such as a lithium ion battery, comprising a matrix of nanographite flakes consisting of a mixture of graphene, multilayer graphene and graphite nanoplatelets, and silicon nanoparticles having a diameter between 1 nm and 100 nm, whereby the aerogel has a three-dimensional structure with pores between the flakes, whereby the specific surface area accommodates a volume expansion of the silicon nanoparticles of at least 400% during lithiation, and wherein the surfaces of the nanographite flakes are for 10 to 90% covered with nanoparticles of silicon or wherein the aerogel has a specific surface area between 10 and 500 m²/g as measured using a
(Continued)

Extreme simplified schematic view of process.

BET (Braunauer-Emmett-Teller). The invention also relates to a method of making the aerogel and an electrode comprising the aerogel.

14 Claims, 7 Drawing Sheets

(51) Int. Cl.
    *H01M 4/133*    (2010.01)
    *H01M 4/1395*    (2010.01)
    *H01M 4/36*    (2006.01)
    *H01M 4/62*    (2006.01)
    *H01M 10/0525*    (2010.01)

(52) U.S. Cl.
    CPC ........... *H01M 4/366* (2013.01); *H01M 4/622* (2013.01); *H01M 10/0525* (2013.01); *H01M 2004/021* (2013.01); *H01M 2004/023* (2013.01); *H01M 2004/027* (2013.01)

(58) Field of Classification Search
    CPC ............... H01M 4/0423; H01M 4/622; H01M 10/0525; H01M 2004/027; H01M 2004/023; H01M 2004/021
    See application file for complete search history.

(56) References Cited

U.S. PATENT DOCUMENTS 9,997,784 B2    6/2018    Su et al.
2009/0117466 A1    5/2009    Zhamu et al.

OTHER PUBLICATIONS

Phadatare et al., "Silicon-Nanographite Aerogel-Based Anodes for High Performance Lithium Ion Batteries", www.nature.com/scientificreports, published online Oct. 10, 2019, pp. 1-9 (Year: 2019).*

International Search Report and Written Opinion for PCT Application No. PCT/EP2020/076530 mailed Dec. 11, 2020.

International Preliminary Report on Patentability Chapter II for PCT Application No. PCT/EP2020/076530 mailed Feb. 24, 2021.

Keli Zhang et al, "Structure-preserved 3D porous silicon/reduced graphene oxide materials as anodes for Li-ion batteries", RSC Advances, (May 4, 2017), vol. 7, No. 39, doi:10.1039/C7RA02240A, pp. 24305-24311.

Nicklas Blomquist et al, "Large-scale graphene production for environmentally friendly and low-cost energy storage", Mid Sweden University, Faculty of Science, Technology and Media, (May 10, 2019), pp. 1-108.

Blomquist, N. et al., "Large-scale production of nanographite by tube-shear exfoliation in water", PLoS One, (20160000), vol. 11, pp. 1-11.

Blomquist, N. et al., "Metal-free supercapacitor with aqueous electrolyte and low-cost carbon materials", Sci. Rep., (20170000), vol. 7, p. 39836.

Jiang, "Free-Standing Si/Graphene Paper Using Si Nanoparticles Synthesized by Acid-Etching Al—Si Alloy Powder for High-Stability Li-Ion Battery Anodes", Electrochim. Acta, (20160000), vol. 188, doi:10.1016/j.electacta.2015.12.023, pp. 777-784.

* cited by examiner

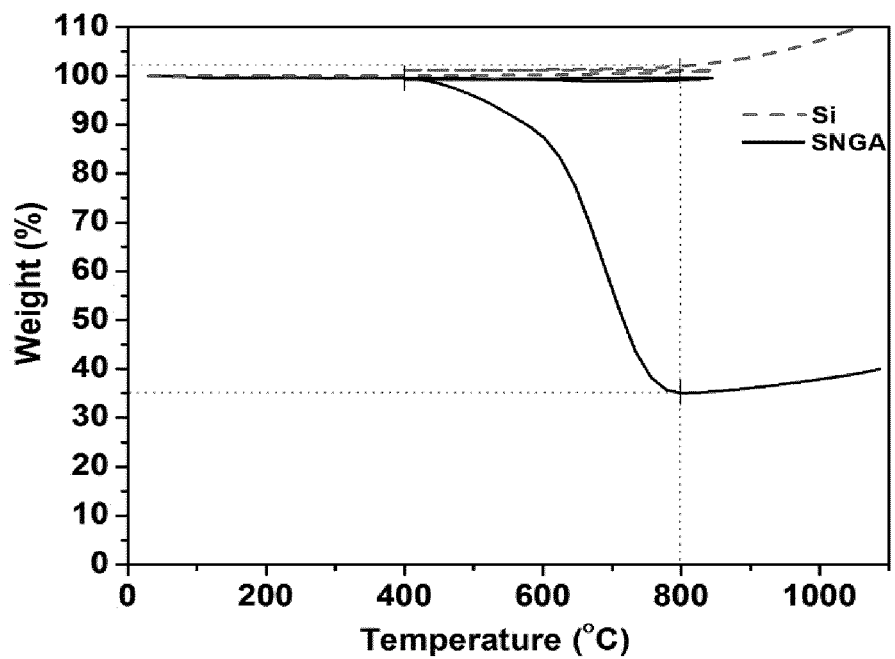
Figure 1: TGA curve of the silicon and SNGA.

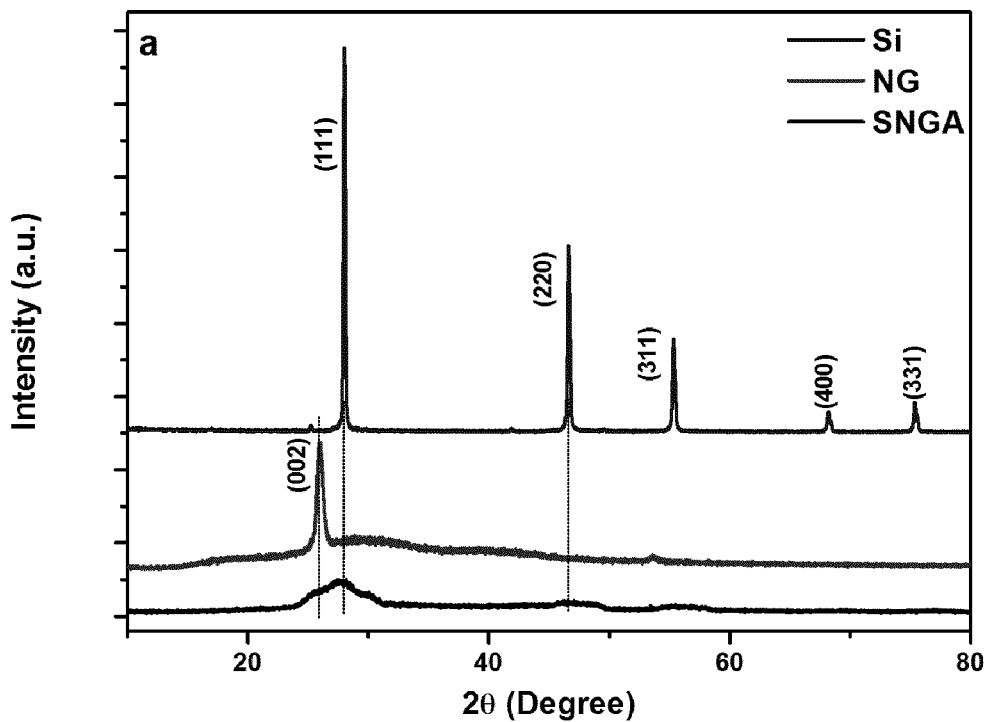
Si highest line, NG middle line and SNGA lowest line
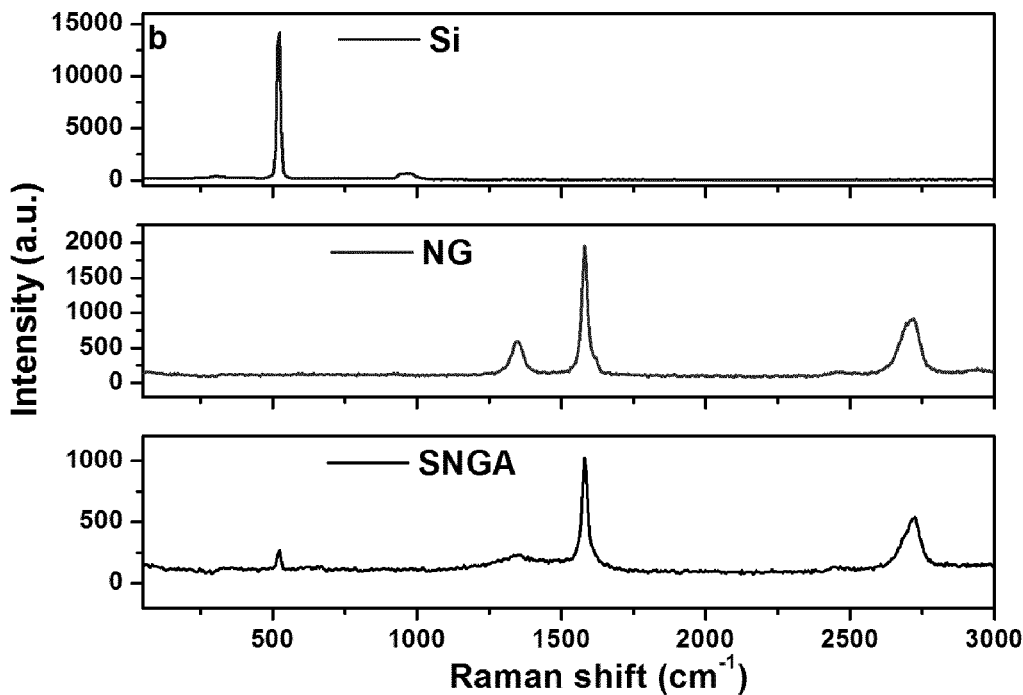
Figure 2: a) XRD pattern and b) Raman spectra of Si, NG, and SNGA.

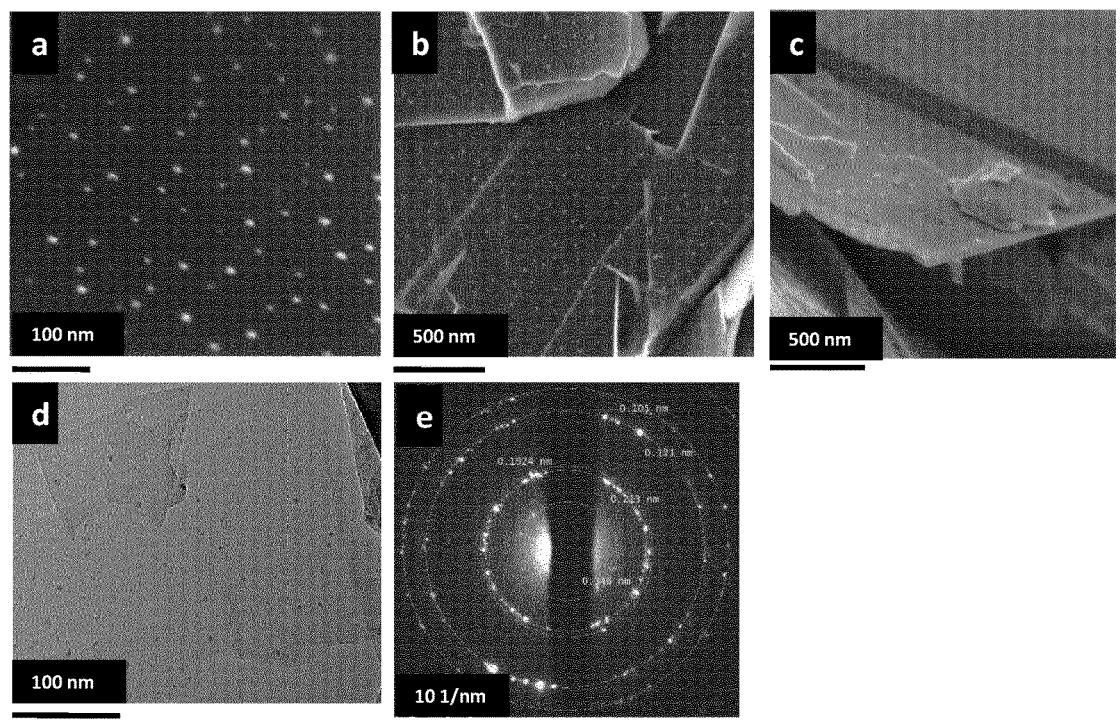
Figure 3 SEM images (a, b and c), TEM image (d) and corresponding SAED pattern (e) of SNGA.

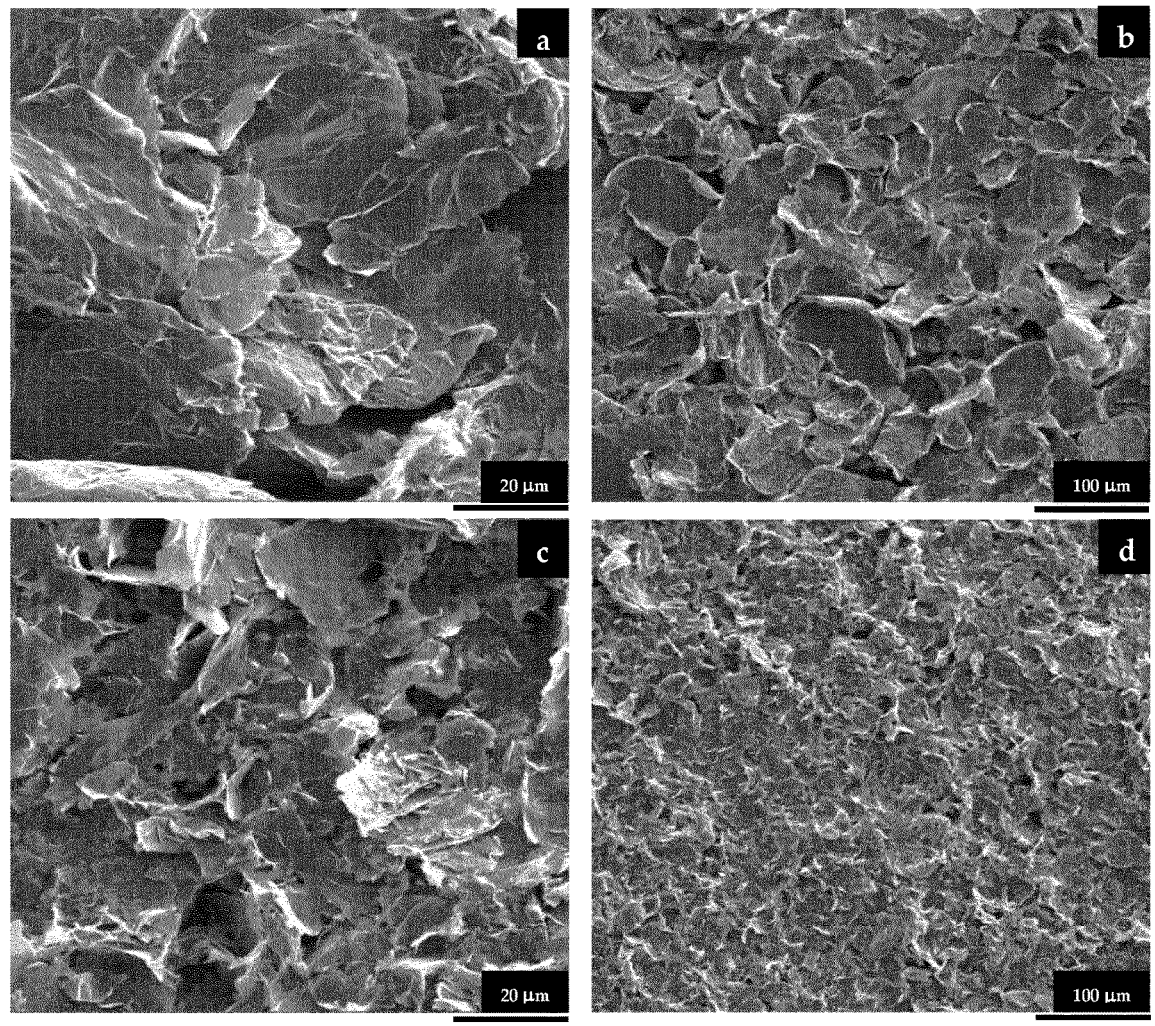
Figure 4: SEM images (a and b) of the NG and (c and d) SNGA/NG electrodes at different magnifications.

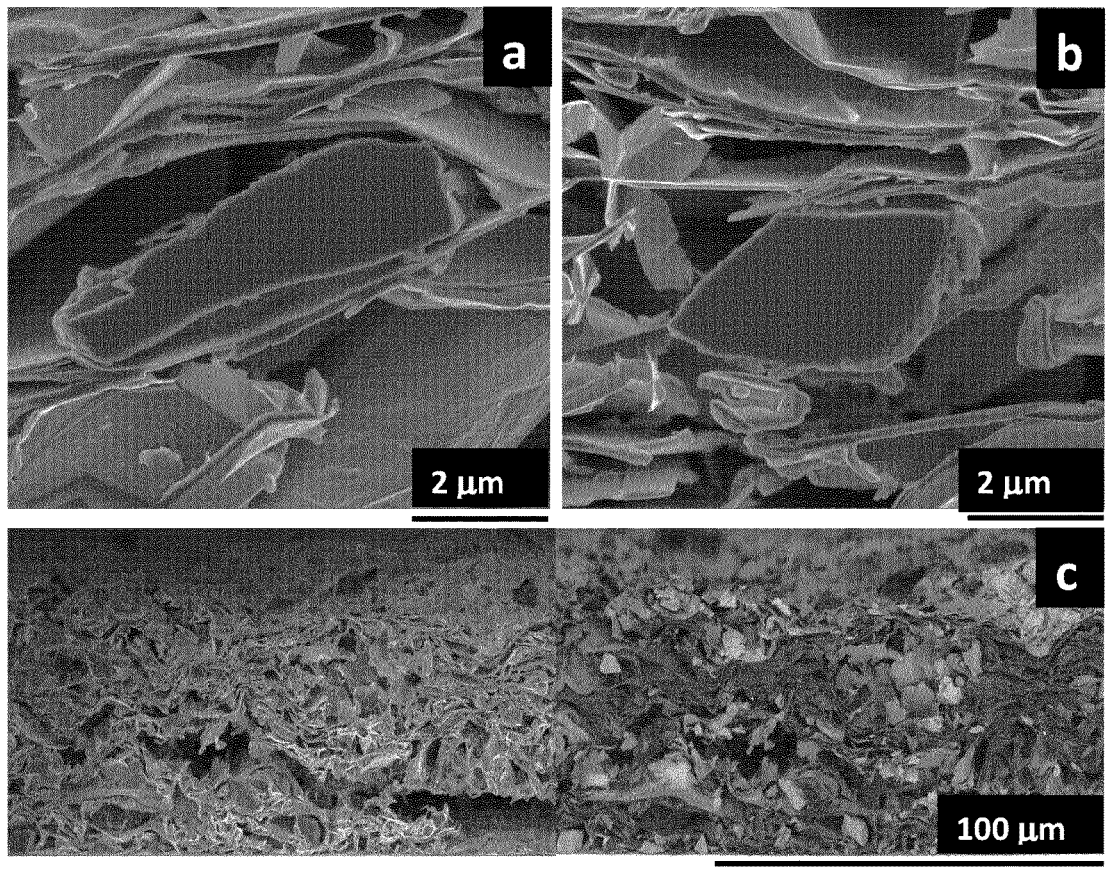
Figure 5: (a and b) Cross sectional SEM images of the SNGA/NG electrode, and (c) In beam SE: LE-BSE cross-sectional image of the SNGA/NG electrode

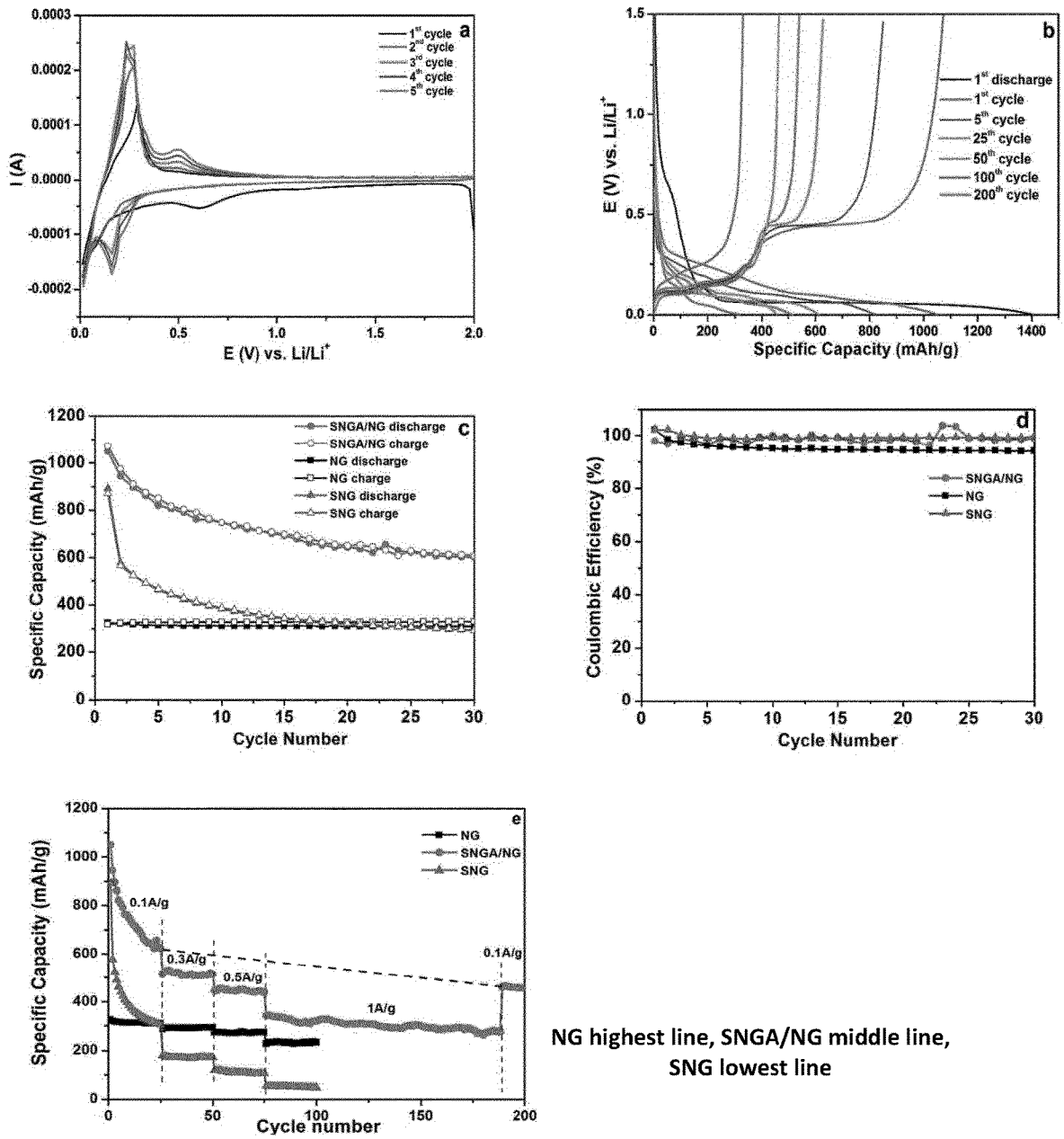

Figure 6: a) Cyclic voltammograms of the SNGA/NG electrode at a scan rate of 0.1 mV s$^{-1}$. b) Typical charge-discharge profiles of the SNGA/NG electrode at the 1$^{st}$ (0.09 C), 5$^{th}$ (0.09 C), 25$^{th}$ (0.27 C), 50$^{th}$ (0.45 C), 100$^{th}$ (0.9 C), and 200$^{th}$ (0.09 C) cycles. c) Specific capacities of the SNGA/NG, NG and SNG electrodes at a current density of 100 mA g$^{-1}$ (equivalent to 0.09 C). d) Coulombic efficiency vs cycle number of the SNGA/NG, NG and SNG electrodes. e) Rate performance of the SNGA/NG, NG and SNG electrodes at different current densities 0.1 A g$^{-1}$ (0.09 C), 0.3 A g$^{-1}$ (0.18 C), 0.5 A g$^{-1}$ (0.45 C), and 1 A g$^{-1}$ (0.9 C).

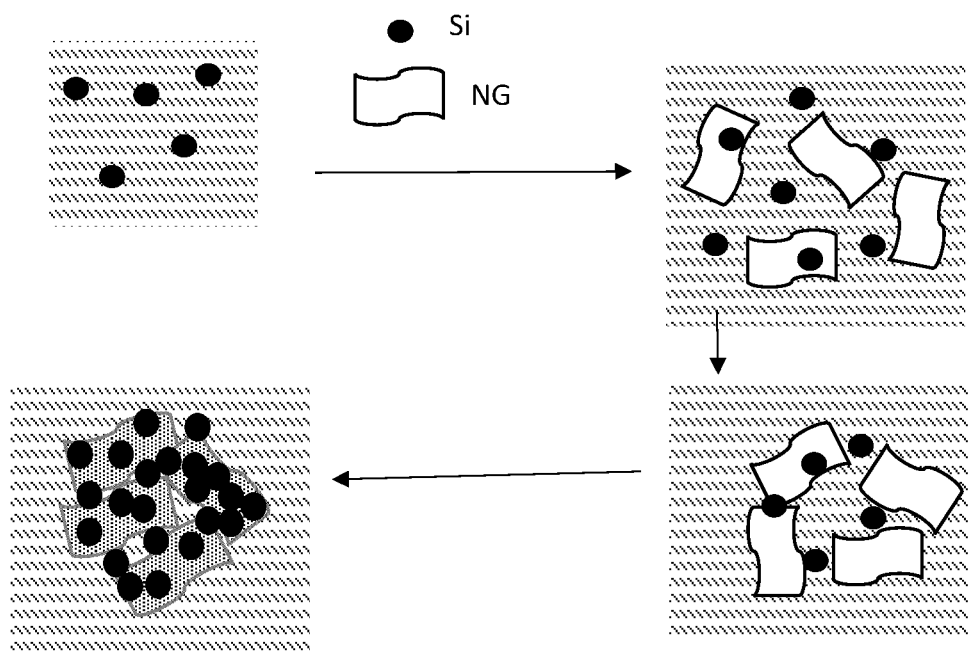
Figure 7. Extreme simplified schematic view of process.

SILICON-NANOGRAPHITE AEROGEL-BASED ANODES FOR BATTERIES

CROSS-REFERENCE TO RELATED APPLICATIONS

This present application is a U.S. national stage application of PCT Application No. PCT/EP2020/076530, filed Sep. 23, 2020, which claims priority to Swedish Patent Application No. 1951066-8 filed Sep. 23, 2019, both of which are hereby incorporated by reference in their entirety.

TECHNICAL FIELD

The present invention relates to a silicon-nanographite aerogel for use as an anode in a battery, such as a lithium ion battery, comprising a matrix of nanographite flakes consisting of a mixture of graphene, multilayer graphene and graphite nanoplatelets, and silicon nanoparticles having a diameter between 1 nm and 100 nm, whereby the aerogel has a three-dimensional structure with pores between the flakes, whereby the specific surface area accommodates a volume expansion of the silicon nanoparticles of at least 400% during lithiation.

BACKGROUND

Rechargeable lithium-ion batteries are popular devices for energy storage due to their high energy density, excellent environmental compatibility, long life cycles, and low self-discharge rates. Lithium-ion batteries are widely used in mobile applications, electric vehicles, and other devices. However, there is an ever-increasing demand to develop lithium-ion batteries with lower weight, larger capacity, and longer cycle life. Traditional lithium-ion batteries use graphite as anode material, which has a maximum theoretical capacity of 372 mAh $g^{-1}$ and poor capacity retention at a high current density. Silicon has attracted considerable attention as one of the most promising anode materials due to its high specific capacity (~4200 mAh $g^{-1}$ for the $Li_{22}Si_5$ phase and ~3579 mAh $g^{-1}$ for the $Li_{15}Si_4$ phase), which is approximately 10~12 times greater than traditional graphite anodes. Silicon (Si) also has a low discharging potential (0~0.4 V vs $Li/Li^+$) compared to other anode materials. Furthermore, Si is abundant, inexpensive, and environmentally friendly, making it an attractive anode material for lithium-ion batteries.

Despite these advantages, Si-based lithium-ion batteries suffer from large volume expansion during the lithiation process, poor electrical conductivity, and short life cycles. In the fully lithiated state of Si, i.e. the $Li_{22}Si_5$ phase, drastic structural changes appear (an approximate 400% volume expansion). This volume expansion leads to pulverization of the Si particles causing rapid degradation of the electrical connectivity of the electrode. Furthermore, when Si expands and contracts, the solid-electrolyte interphase (SEI) film on the outer surface of the electrode breaks up in a cyclic manner, resulting in the continual formation of new insulating SEI film and eventually poor electrical conductivity.

Over the past decade, great attention has been paid to improving the performance of Si-based anode materials by preparing amorphous structures, porous architectures, nanometer scale particle size, and sandwiched designs, among other methods. One effective way to overcome the limitations of Si-based anode materials is preparing Si/carbon composites by coating carbon layers on the Si or incorporating Si into the carbon matrix. However, most of the aforementioned methods involves complex processes and require expensive equipment, resulting in expensive synthesis and greater overall costs, thus limiting the practical application of Si in lithium-ion batteries.

Over the past decade, tremendous attention has been paid to improving the performance of silicon-based anode materials by preparing amorphous structures, porous architectures, nanometer scale particle size, and sandwiched designs, among other methods. An effective way to overcome the limitations of silicon-based anode materials is by preparing silicon/carbon composites by coating carbon layers on the silicon or incorporating silicon into the carbon matrix.

US2009117466 discloses an anode material composition for use in a lithium secondary battery. The composition comprises an electrochemically active material admixed with networks of exfoliated graphite flakes. The electrochemically active material is in fine powder form with particle sizes in the range of 1 nm to 500 μm. This material can be silicon. The exfoliated graphite flakes consist of a network of largely interconnected exfoliated flakes with a typical length/width/diameter dimension of 0.5-100 μm and a thickness of 0.34-500 nm and pores between each other. Electrical conductivity of the graphite flakes is specified as $1\times10^3$-$1\times10^6$ S/m. The electrical conductivity of the electrode is not specified.

U.S. Pat. No. 7,745,047 discloses an anode material composition like that of US2009117466 with the difference that graphene platelets comprising a graphene sheet or a stack of graphene sheets having a platelet thickness less than 100 nm are used, instead of flakes. The in-plane conductivity of the nano-scaled graphene-platelets is specified to $10^4$-$10^5$ S/cm.

U.S. Pat. No. 9,997,784 discloses an anode electrode composition, wherein an anode active material (i.e. silicon nanowires) is grown in situ and naturally lodged in pores of a graphene foam structure. Some of the silicon nanowires are chemically bonded to the graphene pore walls of the foam structure. This "graphene foam" exhibits an "elastic" property in that the cell walls (solid graphene portion of the foam) can be compressed to tightly embrace the anode active material, when an anode layer is made, and silicon nanowires are formed in situ inside the pores. When individual silicon nanowires expand (upon lithium intercalation), the volume expansion is accommodated by local cell walls, without inducing a volume change of the entire anode electrode layer (hence, not exerting internal pressure to the battery). During the subsequent discharge cycle, these silicon nanowires shrink, and the local cell walls shrink or snap back in a congruent manner, maintaining a good contact between cell walls and the silicon nanowires.

U.S. Pat. No. 8,795,899 discloses a positive electrode comprising a plurality of chemically functionalized exfoliated graphite or separated nanographene platelets having a functional group that reversibly reacts with a lithium atom or ion. The negative electrode (anode) comprises an electrode active material capable of absorbing or desorbing Li, e.g. silicon.

Zang et al, RSC Advances, 2017, Vol 7, pp 24305-24311, disclose a silicon-reduced graphene oxide aerogel for use in an anode in a battery. The aerogel is made by solvothermal treatment of a suspension of graphene oxide or Super P carbon and silicon followed by evaporation and freeze-drying. An evaporation dry method has been developed to fine tune the pore size distribution of the three-dimensional porous composition. The graphene and carbon used is expensive and the method developed is not suitable for large scale production in a cost-effective manner. The porosity of the material is still rather high.

Blomquist, N, Large-scale graphene production for environmentally friendly and low-cost energy storage, Mid Sweden University, Faculty of Science, Technology and Media, 2019, ISSN 1652-893X, mentions silicon-nanographite aerogel-based anode material.

Most of the above-mentioned methods involve complex processes and require expensive equipment and materials, resulting in expensive synthesis and greater overall costs, thus limiting the practical application of silicon in lithium ion batteries.

SUMMARY

It is an aim of the present invention to at least partly overcome the above-mentioned problems, and to provide an improved material and method for use in an electrode.

The present invention relates to an improved silicon-nanographite aerogel for use as an anode in a battery, such as a lithium ion battery, comprising or consisting of a matrix of nanographite flakes consisting of a mixture of graphene, multilayer graphene and graphite nanoplatelets, and silicon nanoparticles having a diameter between 1 nm to 1 μm, or between 1 nm and 100 nm, whereby the aerogel has a three-dimensional structure with pores between the flakes, whereby the specific surface area accommodates a volume expansion of the silicon nanoparticles of at least 400% during lithiation, and wherein the surfaces of the nanographite flakes are for 10 to 90% covered with nanoparticles of silicon.

In some aspects, at least 50% of the surfaces of the nanographite flakes are at least for 10% or 50%, or 20% or 50% covered with nanoparticles of silicon. In one aspect, the nanographite flakes are covered with nanoparticles of silicon over at least 50% of the surface. In another aspect, the nanographite flakes are covered with nanoparticles of silicon over at least 60%, or 75% of the surface. In yet another aspect, the nanographite flakes are covered with nanoparticles of silicon over at least 80% of the surface.

The present invention also relates to an improved silicon-nanographite aerogel for use as an anode in a battery, such as a lithium ion battery, comprising or consisting of a matrix of nanographite flakes consisting of a mixture of graphene, multilayer graphene and graphite nanoplatelets, and silicon nanoparticles having a diameter between 1 nm to 1 μm, or between 1 nm and 100 nm, whereby the aerogel has a three-dimensional structure with pores between the flakes, whereby the specific surface area accommodates a volume expansion of the silicon nanoparticles of at least 400% during lithiation, and wherein the aerogel has a specific surface area between 10 and 500 $m^2/g$ as measured using a BET (Braunauer-Emmett-Teller). In one aspect, the specific surface area is between 50 and 500 $m^2/g$, or between 50 and 125 $m^2/g$.

The combination of silicon nanoparticles and nanographite as used in the aerogel of the invention provides for an improved porosity compared to known aerogels. This improves the conductivity of the aerogel. It also improves the cycle stability of the aerogel, and thus increases the life span of the aerogel, when used in an electrode.

In some aspects, the amount of silicon nanoparticles is at least 2 or 3 wt %, wherein wt % are weight percentages of the total weight of the aerogel. In some aspects, the silicon-nanographite aerogel comprises at the most 98%, or 95% silicon. In other aspects, the amount of silicon nanoparticles is at least 6 wt %. In further aspects, the amount of silicon nanoparticles is between 3 and 70 wt %, or between 4 and 60 wt %, or between 6 and 50 wt %.

The nanographite and silicon used in the aerogel is relatively cheap and readily available at a large scale. The aerogel can therefore be manufactured at a large scale at reduced cost compared to prior art aerogels.

Silicon improves the specific capacity of the material. The defined amounts improve the specific capacity, reduces the discharging potential compared to graphite anodes and reduces costs for material.

The nano size of the silicon particles improves the contact between the silicon and the flakes over a large area of the surface of the flakes. Instead of having some contact points between the flakes and the silicon, a large contact surface is provided in the aerogel of the invention.

This increase in contact surface between silicon and the flakes improves the conductivity of the aerogel. The nano size of the silicon particles reduces the volume expansion problem and the porous structure helps to accommodate the volume expansion.

The ratio nanographite to silicon may be about 50:1 to 1:20, or 1:1 to 4:1. In some aspects, the ratio of nanographite to silicon is about 0.1 to 40:1, or about 1.5 to 4:1.

Silicon improves the specific capacity of the material. The defined ratio improves the specific capacity (electrochemical specific capacity), reduces the discharging potential compared to graphite anodes and reduces costs for material.

In one aspect, the silicon particles have a diameter between 1 nm and 2 μm, or between 1 nm and 1 μm, or between 1 nm and 500 nm or between 1 nm and 100 nm.

In an aspect, the thickness of the nanographite flakes is below 100 nm, or between 0.34 nm and 100 nm, or between 0.34 and 100 nm, or between 0.4 and 100 nm, or between 0.6 and 80 nm and a length is between 100 nm and 50 μm. In one aspect, nanographite flakes have a diameter dimension between 0.5 and 100 μm, or between 0.34 and 500 nm. The smaller the size of the flakes, the higher the specific surface area of the aerogel and the better the conductivity of the anode.

In one aspect, the nanographite flakes have a range of different thicknesses and diameters. This variation provides a three-dimensional (3D) structure of the matrix of flakes and silicon particles within the aerogel. It also improves porosity of the matrix of the aerogel.

The 3D porous structure provides an electrode architecture and space to accommodate volume changes during the lithiation/dilithiation process that improves the cycle stability of the anode.

The layer of silicon nanoparticles onto the nanographite flakes improves the performance of the material, such as the specific capacity of the electrode comprising the improved silicon-nanographite aerogel.

Electrical conductivity of the graphite flakes is specified as $1 \times 10^3$ to $1 \times 10^6$ S/m.

In another aspect, the matrix is coated with a layer of carbon. The carbon around the silicon/nanographite matrix provides protection and its porous structure accommodates the volume expansion of the silicon particles, reducing the tensile stresses during contraction and preventing pulverization. The carbon layer effectively blocks signals between silicon particles. Thus, a carbon layer improves efficacy and efficiency of the anode in which the aerogel is used.

In one aspect, the layer of nanoparticles of silicon has a thickness between 5 and 100 nm, or between 0.1 to 0.5 nm.

The invention also relates to an electrode for use as an anode in a battery, such as a lithium ion battery, comprising the silicon-nanographite aerogel as defined above, and added untreated nanographite and a binder.

The binder may be selected from the group comprising or consist of polyvinylidene fluoride (PVDF), sodium carboxymethyl cellulose (CMC), lithium polyacrylate (Li-PAA), sodium polyacrylate (PAANa), polyacryl acid (PAA), chitosan, alginate, gelatine, poly(methacrylic acid), polyvinyl alcohol, polymide, chitosan oligosaccharides, and the like.

In one aspect, the binder is sodium alginate. Sodium alginate has a rich content of carboxylic groups, high Young's modulus, and electrochemical stability, which significantly enhances the columbic efficiency of the electrode.

The added untreated nanographite, is used as an additive to enhance the electrical conductivity of the aerogels by connecting silicon particles onto and between the nanometer thick flakes. The 3D porous structure provides an electrode architecture with more active sites for efficient lithium-ion interactions and space to accommodate volume changes during the lithiation/dilithiation process that improves the cycle stability. Thus, the electrodes show improved specific capacity and cycle stability.

In one aspect, the electrode comprises silicon-nanographite aerogel:untreated nanographite:a binder at a weight ratio of 50-70:20-40:5-15. This ratio provides an optimal increase of specific capacity of the electrodes compared to commercially available electrodes.

In a further aspect, the electrode has a specific capacity of 455 mAh/g after 50 to 200 cycles, or after at least 200 cycles, or until 200 cycles with a coulombic efficiency of 97% at a current density of 100 mA/g. Specific capacity is the charge and/or discharge capacity. This specific capacity is about 30% more than the specific capacity of a commercially available electrode, such as nanographite electrode.

In yet a further aspect, the electrode has a specific capacity if the electrode is recoverable. The specific capacity decreases after each cycle of charging and discharging. The electrode of the invention has an ability to recover its specific capacity by at least 50% or 70% of its initial capacity, when charging and discharging cycles are stopped and then restarted.

In a conventional silicon/nanographite mixture electrode, the silicon particle neither encapsulates in the carbon shell nor has enough space for volume expansion during the lithiation/dilithiation process. During lithiation, the silicon forms silicon-lithium alloy and volume expansion of 300-400% occurs. During the dilithiation process, the silicon-lithium alloy phase is transferred to the silicon and lithium separately and the material contracts to its original stage. In the conventional silicon/nanographite mixture electrode, pulverization of the silicon particles occurs during contraction due to large tensile stresses. After pulverization, an insulating solid-electrolyte interphase layer (SEI) forms on the freshly broken surfaces of the silicon particle and the silicon loses electrical contact from the nanographite and completely detaches from the current collector. Therefore, after the first cycle, only the nanographite participates in the charge-discharge process.

However, in the silicon-nanographite aerogel (SNGA)-based electrodes of the invention, the combination of silicon nanoparticles and nanographite provide for an improved porosity compared to know aerogels. This improves the conductivity of the aerogel. The nano size of the silicon particles improves the contact between the silicon and the flakes over a large area of the surface of the flakes. This further improves the conductivity of the aerogel. The nano size of the silicon particles reduces the volume expansion problem and the porous structure helps to accommodate the volume expansion. The aerogel of the invention has a reduced solid-electrolyte interphase layer (SEI).

In yet a further aspect, the electrode has an electrical conductivity in the range of $2.5 \times 10^3$ kS/m to $10 \times 10^3$ kS/m. An improved electrical conductivity provides for a more efficient and effective electrode. The electrodes prepared based on the silicon-nanographite aerogel as defined above show high specific capacity and cycling stability, thus being a potentially cost-effective method for Si-based anodes.

The invention also relates to a method for manufacturing the silicon-nanographite aerogel as defined above, comprising or consisting of the steps of:
1) dispersing the silicon particles in a water-soluble biodegradable, biocompatible, and nontoxic polymer solution, such as polyvinyl alcohol,
2) adding nanographite flakes consisting of a mixture of graphene, multilayer graphene and graphite nanoplatelets,
3) heating the aerogel to at least 500° C., in an inert atmosphere, thereby vaporizing the silicon particles,
4) cooling the aerogel to room temperature, thereby condensing the silicon vapor on the surfaces of the nanographite flakes,
whereby the product obtained in step 4) is coated with carbon from vaporized carbon present in the polymer solution used in step 1).

In some aspects, the polymer solution is selected from the group comprising or consisting of polyacrylic acid, sodium alginate, nylon, polyethylene, polyester, Teflon and cellulose.

In one aspect, the polymer solution is polyvinyl alcohol (PVA). PVA is a synthetic water-soluble polymer with good biodegradability, and biocompatibility, and is nontoxic and environmentally friendly.

In some aspects, the temperature in step 3) is between 400 and 1400° C., or between 500 and 900° C., or between 600 and 900° C., or about 800° C. The pressure may be an atmospheric pressure of 1,013.25 hPa. In some aspects, the heating is done using an oven, or microwaves, or lasers, or infrared light. The inert gas may be nitrogen, in which case the temperature will be below 1200° C. to prevent the formation of silicon nitrate.

In some aspects of the method, the nanographite flakes have a thickness between 0.34 nm and 100 nm and a length between 100 nm and 50 μm.

In some aspects of the method, the weight ratio of silicon to nanographite flakes 0.1 to 40:1, or 1 to 4:1.

In some aspects of the method, the condensed silicon nanoparticles have a diameter between 1 and 100 nm, or between 5 and 100 nm.

The invention also relates to the silicon-nanographite aerogel as defined above prepared by the method as defined above. In one aspect, the electrode as defined above comprises the SNGA prepared with the method.

In another aspect, freeze drying is used after step 2), at a temperature between −50 and −20° C., or about −30° C. The freezing time may be between 0 and 48 hours, or between 12 and 36 hours or between 18 and 30 hours, or about 24 hours.

In a further aspect, stirring is used in step 2). The stirring may be performed at between 1000 and 1500 rpm, or about 1200 rpm until a gel is formed. The stirring may be performed at a temperature between 40 and 200° C., or between 70 and 150° C., or between 70 and 100° C., or between 40 and 80° C.

In a further aspect, the hydrogel is heated in step 3) for 0.001 to 5 hours, or 0.025 to 5 hours, or 0.5 to 5 hours, or 0.1 to 3 hours, or 1 to 3 hours, or for 2 hours. The time needed in this step depends on the method used for heating. When heating by microwave and laser, the time needed might be less compared to heating using an oven.

The method is simple to perform, less complex compared to prior art methods, scalable and the manufacturing costs are relatively low. Furthermore, the method can be performed in an environmentally friendly manner due to the use of among others biodegradable and biocompatible chemical substances.

The method does not require expensive equipment for the synthesis of silicon-nanographite aerogel. Some advantages of the method are that the nanoparticles become very small and thus reduce the problem with expansion problem and thereby provide a highly stable electrochemical performance and the physical and thus electrical contacts between nanographite and silicon is between compared to prior art aerogels. The method provides for an aerogel having a reduced SEI.

Nanographite and silicon are relatively cheap compared to use of graphene oxide or Super-P carbon. Nanographite and silicon are readily available, which allows for large scale production. The nano size of the silicon particles is manufactured using a simple vaporizing technique. By subsequent condensation, the silicon nanoparticles are allowed to grow on the surface of the flakes. This assures that a larger area of the flakes is covered by the nanoparticles. The surfaces of the nanographite flakes are for 10 to 90%, or 20 to 80%, or 40 to 60% covered with nanoparticles of silicon. The nano size improves the contact between the silicon and the flakes compared to larger silicon particles. This increase in contact surface between silicon and the flakes improves the conductivity of the aerogel. In contrast, in the prior art aerogels, where the silicon nanoparticles are mixed with graphene or carbon. These aerogel are not only more expensive and less scalable, the contact surface between silicon and graphene or carbon is less compared to the contact surface in the aerogel of the invention. The nano size of the silicon particles as grown on the flakes using the method of the invention, reduces the volume expansion problem and the porous structure helps to accommodate the volume expansion.

The method provides an aerogel having an improved porosity compared to prior art aerogels. This again improves the effectiveness and efficiency of the anode, in which the aerogel is used.

The carbon around the silicon/nanographite matrix provides protection and its porous structure accommodates the volume expansion of the silicon particles, reducing the tensile stresses during contraction and preventing pulverization.

BRIEF DESCRIPTION OF THE DRAWINGS

The invention will now be explained more closely by the description of different embodiments of the invention and with reference to the appended figures.

FIG. 1 shows thermogravimetric analysis (TGA) curve of the sample silicon-nanographite aerogel (SNGA) and silicon.

FIG. 2 shows a) X-ray diffraction pattern and b) Raman spectra of silicon (Si), nanographite (NG)e, and silicon-nanographite aerogel (SNGA).

FIG. 3 shows an SEM images (a, b and c), TEM image (d) and corresponding SAED pattern (e) of SNGA.

FIG. 4 shows an SEM images (a and b) of the NG and (c and d) SNGA/NG electrodes at different magnifications.

FIG. 5 shows (a and b) Cross sectional SEM images of the SNGA/NG electrode, and (c) In beam (SE:BSE) cross-sectional image of the SNGA/NG electrode.

FIG. 6 shows a) Cyclic voltammograms of the SNGA/NG electrode at a scan rate of 0.1 mV s−1. b) Typical charge-discharge profiles of the SNGA/NG electrode at the 1st (0.09 C), 5th (0.09 C), 25th (0.27 C), 50th (0.45 C), 100th (0.9 C), and 200th (0.09 C) cycles. c) Specific capacities of the SNGA/NG, NG and SNG electrodes at a current density of 100 mA g−1 (equivalent to 0.09 C). d) Coulombic efficiency vs cycle number of the SNGA/NG, NG and SNG electrodes. e) Rate performance of the SNGA/NG, NG and SNG electrodes at different current densities 0.1 A g−1 (0.09 C), 0.3 A g−1 (0.18 C), 0.5 A g−1 (0.45 C), and 1 A g−1 (0.9 C).

FIG. 7 shows schematically the preparation of silicon-nanographite aerogel.

DETAILED DESCRIPTION

Definitions

As used herein "powder" means micrometer sized silicon. The size of the silicon powder particles is between 0.5 micrometer and 100 micrometer.

As used herein "nanoparticles" means silicon particles having a size of between 1 nanometer and 100 nanometer.

As used herein "nanographite" means graphite consisting of graphene, multilayer graphene, and graphite nanoplatelets, whereby the flakes have a thickness of between 0.34 nanometer and 100 nanometer and a length or lateral size between 100 nanometer and 50 micrometer.

As used herein "room temperature" means a temperature between 16 and 25° C.

As used herein "inert atmosphere" means an atmosphere devoid of reactive gases.

The invention relates to a silicon-nanographite aerogel comprising a matrix of nanographite flakes consisting of a mixture of graphene, multilayer graphene and graphite nanoplatelets, and silicon nanoparticles.

The silicon nanoparticles may have a diameter between 1 nm to 2 µm, or between 1 nm to 1 µm, or between 1 nm and 500 nm, or between 1 nm and 250 nm, or between 1 nm and 150, or between 1 nm and 100 nm, or between 5 and 100 nm. The silicon nanoparticles are made from silicon microparticles having a diameter between 0.5 µm and 100 µm, or between 0.5 µm and 50 µm, or between 0.5 µm and 25 µm, or between 0.5 µm and 10 µm, or between 0.5 µm and 5 µm, or between 0.5 and 1.5 µm.

The nanographite flakes may have a thickness between 0.34 nm and 100 nm, or between 0.34 nm and 75 nm, or between 0.34 nm and 60 nm, or between 0.34 nm and 50 nm.

The nanographite flakes may have a length between 100 nm and 50 µm, or between 100 nm and 25 µm, or between 100 nm and 10 µm.

The aerogel has a three-dimensional structure with pores between the flakes, whereby the specific surface area accommodates a volume expansion of the silicon nanoparticles of at least 400% during lithiation. The specific surface area of the aerogel can be used as a measure for the porosity of the aerogel. The aerogel may have a specific surface area between 10 and 750 m$^2$/g as measured using a BET (Braunauer-Emmett-Teller). The specific surface area may be between 10 and 500 m$^2$/g, or between 10 and 250 m$^2$/g, or between 10 and 150 m$^2$/g, or between 10 and 100 m$^2$/g, or between 10 and 90 m$^2$/g, or between 20 and 90 m$^2$/g, or between 30 and 90 m$^2$/g, or between 40 and 90 m$^2$/g. The specific surface area may be around 1000 m$^2$/g or less, or 750 m$^2$/g or less, or 600 m$^2$/g or less. In an aspect the specific surface area is 400 m²/g or less. In another aspect, the specific surface area is 125 m²/g or less, or 100 m²/g or less.

The surfaces of the nanographite flakes are covered with nanoparticles of silicon. The surfaces may be covered for 10 to 90% with nanoparticles of silicon. Some flakes may only be covered for 10 to 30%, while other flakes may be covered for 50 to 99%. At least 50 to 75% of the surfaces of the nanographite flakes may be for 10 to 90%, or 20 to 90%, or 30 to 90%, or at least for 20% or 50% covered with nanoparticles of silicon.

The surfaces of the nanographite flakes may be for 10 to 90% covered with nanoparticles of silicon and the specific surface area may be between 10 and 500 m²/g as measured using the BET (Braunauer-Emmett-Teller). Or the surface may be for 30 to 90% covered with nanoparticles of silicon and the specific surface area may be between 30 and 100 m²/g. Or the surface may be for 50 to 90% covered with nanoparticles of silicon and the specific surface area may be between 50 and 100 m²/g.

The amount of silicon nanoparticles in the aerogel may be at least 3 wt %, wherein wt % are weight percentages of the total weight of the aerogel. The amount may be at least 5 wt %, or at least 6 wt %, or between 3 and 100 wt %, or between 4 and 98 wt %, or between 6 and 80 wt %.

The ratio of nanographite to silicon may about 0.1 to 40:1, or 1:1 to 4:1. The ratio of nanographite to silicon may be about 1 to 4:1, or about 1.5 to 4:1.

The invention also relates to an electrode for use as an anode in a battery comprising the silicon-nanographite aerogel as defined anywhere above together with and added untreated nanographite, and a binder.

The electrode may comprise the silicon-nanographite aerogel comprising or consisting of a matrix of nanographite flakes consisting of a mixture of graphene, multilayer graphene and graphite nanoplatelets, and silicon nanoparticles having a diameter between 1 nm and 90 nm, whereby the nanographite flakes have a thickness between 0.344 nm and 90 nm and a length between 100 nm and 25 µm, and the amount of silicon nanoparticles in the aerogel may be at least 5 wt %, and the specific surface area is between 25 and 125 m²/g.

The binder may be selected from the group comprising or consisting of polyvinylidene fluoride (PVDF), sodium carboxymethyl cellulose (CMC), lithium polyacrylate (Li-PAA), sodium polyacrylate (PAANa), polyacrylic acid (PAA), chitosan, alginate, gelatine, poly(methacrylic acid), polyvinyl alcohol, polyamide, chitosan oligosaccharides, and the like. The binder may be sodium alginate.

The electrode may have a specific capacity of 455 mAh/g after 50 to 200 cycles, or after 100 to 200 cycles, or after 150 to 200 cycles, or after at least 200 cycles, with a coulombic efficiency of 97% at a current density of 100 mA/g.

The electrode may have an electrical conductivity of the electrode is in the range of $2.5 \times 10^3$ kS/m to $10 \times 10^3$ kS/m.

The invention also relates to a method for manufacturing the silicon-nanographite aerogel as defined anywhere above, comprising or consisting of the steps of:
1) dispersing the silicon particles in a water-soluble biodegradable, biocompatible, and nontoxic polymer solution,
2) adding nanographite flakes consisting of a mixture of graphene, multilayer graphene and graphite nanoplatelets,
3) heating the aerogel to at least 500° C. in an inert atmosphere, thereby vaporizing the silicon particles,
4) cooling the aerogel to room temperature, thereby condensing the silicon vapor on the surfaces of the nanographite flakes, whereby the product obtained in step 4) is coated with carbon from vaporized carbon present in the polymer solution used in step 1).

The polymer solutions may be selected from the group comprising or consisting of polyacrylic acid, sodium alginate, nylon, polyethylene, polyester, Teflon, cellulose. The polymer solutions may be polyvinyl alcohol.

The silicon microparticles in step 1) may have a diameter between 0.5 µm and 100 µm, or between 0.5 µm and 50 µm, or between 0.5 µm and 25 µm, or between 0.5 µm and 10 µm, or between 0.5 µm and 5 µm.

The condensed silicon nanoparticles may have a diameter between 1 and 100 nm, or between 5 and 100 nm.

The method defined above may be used to manufacture a silicon-nanographite aerogel comprising or consisting of a matrix of nanographite flakes consisting of a mixture of graphene, multilayer graphene and graphite nanoplatelets, and silicon nanoparticles having a diameter between 1 nm and 90 nm, whereby the nanographite flakes have a thickness between 0.34 nm and 90 nm and a length between 100 nm and 25 µm, and the amount of silicon nanoparticles in the aerogel may be at least 5 wt %, and the specific surface area is between 25 and 125 m²/g.

Experimental

Materials and Methods

Polyvinyl alcohol (PVA) (Average molecular weight: 9000-10000) and sodium alginate were purchased from Sigma Aldrich. Nanographite (NG) was produced using a large-scale tube shear process that allows the high volume and low-cost production of nanographite-based devices according to routes described in Blomquist, N. et al. Large-scale production of nanographite by tube-shear exfoliation in water. PLoS One 11, 1-11 (2016), and Blomquist, N. et al. Metal-free supercapacitor with aqueous electrolyte and low-cost carbon materials. Sci. Rep. 7, 39836 (2017), without further modification.

Nanographite is produced by hydrodynamic tube-shearing process which can produce large quantities of nanographite. This process produces micrometer-wide and nanometer-thick flakes of nanographite. The exfoliation occurs in an aqueous environment without using any toxic chemicals or organic solvents, making the process environmentally friendly.

Nanographite is a mixture of graphene, multilayer graphene, and graphite nanoplatelets. The particles are less than 100 nm thick. Silicon powder, with particle size about 1 µm, measured by SEM, was obtained from VestaSi Europe AB. 0.25 g of silicon was dispersed in PVA solution (2 wt %) under vigorous stirring for 30 min using Ultra-Turrax T25 with an S 25 N-10 G shear head at 10 k rpm. Then, 0.5 g of exfoliated nanographite was added to the suspension and stirred for 30 min to form a silicon/nanographite suspension. The suspension was stirred during heating at 90° C. using a magnetic stirrer at 1200 rpm to form silicon-nanographite hydrogels. The hydrogels were washed several times with distilled water and freeze dried at −30° C. for 24 h. Subsequently, the hydrogels were heat in a tube furnace at 800° C. for 2 h in a nitrogen atmosphere to form the silicon-nanographite aerogels (SNGA). A schematic of the preparation of SNGA is shown in FIG. 7.

Material Characterization

Structural characterization was conducted using X-ray diffraction (XRD, Bruker D2 phaser) with Cu-Kα (λ=1.54184 Å) radiation in the 2θ range 10° to 80° with the step width 0.01°. Raman spectra of the samples were obtained using a Raman microscope (Horiba XploRA PLUS, laser excitation at 532 nm) in a frequency range of 50-3000 cm$^{-1}$. The microstructure of the SNGA and surface morphology of the electrodes was investigated using a field emission scanning electron microscope at 2 kV (FESEM; MAIA3, TESCAN) and a transmission electron microscope at 300 kV (Tecnai F30). Thermogravimetric analysis of SNGA and Silicon was performed using the instrument Mettler Toledo TGA-1 in order to calculate the weight percentage of silicon in the SNGA structure. The sample was heated to 850° C. in nitrogen atmosphere at 20° C./min rate, followed by a 10 min isotherm at 400° C. Afterwards, the measurement was changed to oxygen atmosphere and heated from 400 to 1100° C. at 20° C./min heating rate.

Electrochemical Measurement

The SNGA, nanographite, and sodium alginate (as a binder) were mixed at a weight ratio of 60:30:10 using Ultra-Turrax T25 with an S 25 N-10 G shear head at 10 k rpm for 1 h. Sodium alginate was selected as a binder due to its rich content of carboxylic groups, high Young's modulus, and electrochemical stability, which significantly enhances the columbic efficiency, specific capacity, and cycle stability. The mixture of SNGA, NG and binder was deposited on copper foil (1 mg cm$^{-2}$) to prepare the electrodes (label: SNGA/NG). Two reference electrodes were prepared by mixing i) nanographite and sodium alginate binder (weight ratio 90:10) labeled as NG and ii) silicon, nanographite and sodium alginate (weight ratio 21:69:10) labeled as SNG. The half cells of these electrodes were assembled in a glove box filled with highly pure argon gas ($H_2O$<0.1 ppm and $O_2$<0.1 ppm). Lithium metal foil was used as reference and counter electrode. The electrolyte used was LP40, that is, 1 M Lithium hexafluorophosphate ($LiPF_6$ in a mixture of ethylene carbonate (EC) and diethyl carbonate (DEC) in a 1:1 weight ratio. Celgard 2325 was used as a separator.

Cyclic voltammetry (CV) tests were performed between 0.01 and 2.0 V at a scan rate of 0.1 mV s$^{-1}$ using a VersaSTAT 4 Potentiostat. Galvanostatic charge-discharge tests of the cells were performed using a LabVIEW-based PXI system in a voltage range between 0 and 1.5 V at various current densities. The capacities and current densities were calculated based on the weight of the active materials (total weight of SNGA+NG in case of SNGA/NG electrode, weight of NG in case of NG electrode and total weight of Si+NG in case of SNG electrode) without binder. All of the electrochemical measurements were conducted at room temperature.

Results and Discussion

TGA measurement of the SNGA and Silicon was performed by heating/cooling in nitrogen atmosphere 30-850-400° C. with at the rate of 20° C./min. followed by 10 min. isotherm at 400° C. and is shown in FIG. 1. Thereafter, a switch to oxygen atmosphere was made, followed by heating from 400 to 1100° C. with the 20° C./min. heating rate. TGA measurement of the silicon was carried out to determine the exact percentage of the silicon in the aerogel composite. TGA measurement of silicon shows small gain in weight indicating oxidation of silicon with the formation of $SiO_x$. From the TGA curve of the SNGA sample, it is observed that the there is no appreciable weight loss in the nitrogen atmosphere. In the oxygen atmosphere, there is a weight loss of 64% started at 400° C. and ends at 800° C., corresponds to combustion of graphite. Based on this result, the content of silicon in the SNGA structure is calculated to be 34.65%. The SNGA, nanographite, and sodium alginate binder were mixed at a weight ratio of 60:30:10 to prepare the electrode. Hence, percentage of silicon is 20.79% in the final electrode.

The XRD patterns of Si, NG, and SNGA are shown in FIG. 2a. For Si, five diffraction peaks are observed at 28.3°, 47.0°, 55.8°, 68.4°, and 75.5°. These diffraction peaks are related to Bragg's reflections from the (111), (220), (311), (400), and (331) planes of the Si phase (JCPDS no. 27-1402), respectively. For NG, a diffraction peak is observed at 26.1 that corresponds to the (002) plane of graphite. The significant reduction of the characteristic peak of silicon and nanographite observed in the XRD pattern of SNGA may be due to the presence of amorphous substances covering the structure. The thickness and uniformity of amorphous substances blocks the X-rays from reaching the crystalline silicon particles and nanographite flakes suppressing their peaks in corresponding XRD pattern.

Raman spectroscopy was carried out to study the structural aspects of Si, NG and SNGA samples. FIG. 2b shows the Raman spectra of Si, NG, and SNGA. Both Si and SNGA shows the peak centered at 523 cm$^{-1}$ which corresponds to crystalline Si. Thus, it is clear that there is no phase change of Si during the aerogel preparation process. The peaks observed at 1346, 1579, and 2720 cm$^{-1}$ of the samples NG and SNGA are related to graphite. These peaks correspond to the D, G, and 2D bands, respectively. Similarly, there is no change in graphite phase.

SEM images of the SNGA structure are shown in the FIGS. 3a, b and c revealing the presence of nanoparticles on the nanographite flakes. To further analyze these nanoparticles; TEM images of the SNGA structure were taken. FIG. 3d shows the TEM image of the SNGA. TEM analysis further reveals, in SNGA structure the nanoparticles covering the nanographite flakes are of silicon/silica; Both SEM EDS and TEM EDS shows presence of silicon and oxygen, however in SEM EDS oxygen is at higher ratio indicating silicon to be of $SiO_x$ form. The selected area electron diffraction (SAED) pattern shown in FIG. 3e exhibits the rings made up of discrete spots. The rings correspond to reflections with d spacing 0.346 nm, 0.213 nm, 0.1924 nm, 0.121 nm and 0.105 nm. The reflections with d spacing 0.346 nm, 0.213 nm, 0.121 nm and 0.105 nm corresponds to (002), (100), (110) and (201) planes of graphite respectively while the reflection with d spacing 0.1924 nm is due to (220) plane of silicon implying presence of nanographite and silicon. One likely mechanism describing the formation of particles can be understood by a silane route. PVA undergoes pyrolysis at about 230° C., decomposes rapidly and further reacts with silicon in nitrogen atmosphere forming a gaseous silane ($SiH_4$). The silane gas diffuses over the graphite flakes and further undergoes thermal degradation due to high temperatures forming the silicon nanoparticles over the nanographite flakes (as seen in the SEM and TEM image). However, after aerogel preparation process, part of the silicon nanoparticles undergo oxidation when air comes inside the tube furnace forming $SiO_x$. Further, the NG aerogel was prepared by the same procedure described above. These structures do not show presence of any nanoparticles on the nanographite flakes. From SEM image, the estimated amount of silicon nanoparticles in the SNGA structure is around 10.37(2) weight %. (Hence, the amount of silicon nanoparticles in the SNGA/NG electrode is 6.2(2) weight %. Therefore, in the SNGA/NG electrode out of 20.79 silicon, 6.2 is nanosized silicon and remaining 14.59 is silicon microparticles.

FIG. 5 shows (a and b) is a cross sectional SEM images of the SNGA/NG electrode, and (c) In beam secondary electron: back scattered electron (SE:BSE) image cross-sectional image of the SNGA/NG electrode. From FIG. 5 a, b and c it is observed that the SNGA/NG electrode have a porous structure with smaller and larger pores. SE:BSE gives the insights of the electrode wherein the BSE contrast image (FIG. 5c) shows mainly silicon powder remained in the structure which is not converted to the silicon nanoparticles.

Electrode Analysis

SEM images of the NG and SNGA/NG electrodes at 20 μm and 100 μm are shown in FIG. 4a, b, c, and d, respectively. From FIGS. 4a and b, the NG electrode contains nanographite flakes of different sizes that are stacked over each other. A few pores are observed in these structures, which are formed due to the stacking of nanographite flakes of different sizes. However, FIGS. 4c and d demonstrate that the SNGA/NG electrode that contains Si-nanographite aerogels with nanographite shows a large number of small and large pores with relatively smaller nanographite flakes.

The charging/discharging mechanism of the SNGA/NG electrode (as an anode) for lithium-ion batteries was investigated using CV. The CV measurements were performed on half cells in a voltage range between 0.01 to 2.0 V at a scan rate of 0.1 mV s$^{-1}$ for five cycles as shown in FIG. 6a. A cathodic peak is observed from 0.78 to 0.46 V in the first scan, which is attributed to the formation of a thin SEO layer. This peak disappeared in the successive cycles, indicating the formation of an SEI in the first cycle. Another cathodic peak is observed in the first cycle at 0.01 V, which is characteristic of lithiation of crystalline and amorphous Si. This splits into two peaks at 0.16 and 0.01 V in the second cycle and becomes sharper in the further cycles. These peaks belong to the lithiation of Si and formation of a Li—Si alloy. In the first cycle, one anodic peak at 0.29 V is characteristic of amorphous Si and splits into two peaks at 0.29 and 0.49 V in the second cycle and becomes sharper in the further cycles. These peaks correspond to the phase transition from Li—Si alloy to Si. After the first cycle, the intensities of the cathodic and anodic peaks increase, indicating improvement in the Li insertion and extraction kinetics.

To study the electrochemical performance of the SNGA/NG electrode, galvanostatic charge-discharge measurements were conducted at a current density of 100 mA g$^{-1}$ (equivalent to 0.09 C) in a voltage range of 0 to 1.5 V. Galvanostatic charge-discharge measurements of the NG and SNG electrodes were also conducted at the same current density and voltage range for comparison. The typical charge-discharge profiles of the SNGA/NG electrode at the 1$^{st}$, 5$^{th}$, 25$^{th}$, 50$^{th}$, 100$^{th}$, and 200$^{th}$ cycles is shown in FIG. 5b. The current density in the 1$^{st}$, 5$^{th}$, 25$^{th}$ cycles was 0.1 A g$^{-1}$ and that of the 50$^{th}$, 100$^{th}$, and 200$^{th}$ cycles was 0.3 A g$^{-1}$ (0.27 C), 1 A g$^{-1}$ (0.9 C), and 0.1 A g$^{-1}$, respectively. The first discharge shows two slopes between 0.78-0.46 V and 0.16-0.01 V, which can be correlated with the cathodic peaks observed at the same position in the discharge of the first cycle in CV. This is largely responsible for the electrode's capacity. The slope between 0.78 and 0.46 V (corresponding to the formation of the stable SEI layer) disappears in subsequent cycles while a slope between 0.16 and 0.01V is present in the discharge of subsequent cycles. From the charge-discharge profiles of the SNGA/NG electrode, the plateaus between 0.16-0.01 V are present up to 200 cycles, indicating that lithiation-dilithiation occurs in the Si particles without pulverization and disintegration from the current collector.

FIGS. 6c and d show the cycling performance and corresponding coulombic efficiency of the SNGA/NG, NG and SNG electrodes at a current density of 100 mA g$^{-1}$. In the first cycle, the SNGA/NG electrode has a discharge capacity of 1050 mAh g$^{-1}$ and a charge capacity of 1072.2 mAh g$^{-1}$ with a coulombic efficiency of 97.9%, while the NG electrode has a discharge capacity of 325.8 mAh g$^{-1}$ and a charging capacity of 318.7 mAh g$^{-1}$ with a coulombic efficiency of 102.2% and the SNG electrode has a discharge capacity of 890.7 mAh g$^{-1}$ and a charging capacity of 870.6 mAh g$^{-1}$ with a coulombic efficiency of 102.3%. In the second cycle, the discharge capacity decreases to 944.4 mAh g$^{-1}$, 319.8 mAh g$^{-1}$ and 577.4 mAh g$^{-1}$ for SNGA/NG, NG and SNG, respectively. Finally, in the 30$^{th}$ cycle, the discharge capacity decreases to 603.1 mAh g$^{-1}$, 310 mAh g$^{-1}$ and 293.7 mAh g$^{-1}$ for SNGA/NG, NG and SNG, respectively. The specific capacity of the SNGA/NG electrode is higher than the NG and SNG electrodes in all the cycles. The electrodes SNGA/NG and SNG has the same percentage of silicon but there is a significant difference in their capacities and capacity retention.

The charge-discharge studies of the SNGA/NG, NG and SNG electrodes were conducted at different current densities of 0.1 A g$^{-1}$ (0.09 C), 0.3 A g$^{-1}$ (0.27 C), 0.5 A g$^{-1}$ (0.45 C), and 1 A g$^{-1}$ (0.9 C) and the corresponding results are provided in FIG. 6e. The specific capacities of the SNGA/NG, NG and SNG electrodes in the 25$^{th}$ cycle are 622.5 mAh g$^{-1}$, 310.2 mAh g$^{-1}$ and 304.8 mAh g$^{-1}$ respectively, at a current density of 0.1 A g$^{-1}$. After increasing the applied current density to 0.3 A g$^{-1}$ (after 25 cycles), the capacity falls by 17% in the SNGA/NG electrode, 7% in the NG electrode and 41% in the SNG electrode, remaining almost constant afterwards. When the applied current density increases to 0.5 A g$^{-1}$ (after 50 cycles), there is a decrease in the specific capacity of 13%, 7% and 30% in the SNGA/NG, NG and SNG electrodes, respectively, remaining constant thereafter. Whereas at higher applied current densities (1 A g$^{-1}$), there is a 22%, 20% and 49% decrease in the specific capacity in the SNGA/NG, NG and SNG electrodes, respectively, which remains constant. At 100$^{th}$ cycles, the capacity of the SNGA/NG electrode is significantly larger than that of the NG and SNG electrodes. Further, cyclic stability measurements were conducted on the SNGA/NG electrode at an applied current density of 1 A g$^{-1}$ up to 189 cycles and continued up to 200 cycles at 0.1 A g$^{-1}$. The corresponding results are shown in FIG. 6e. When the applied current density decreased to 0.1 A g$^{-1}$ (after 189 cycles), 74% specific capacity is recovered, and stable capacity is delivered for the SNGA/NG electrode. This indicates that Si continues to contribute to the specific capacity of the electrode up to 200 cycles.

The specific capacity of the SNGA/NG electrode for the first cycle is 1050 mAh g$^{-1}$ (that is almost equivalent to the theoretical capacity 1084 mAh g$^{-1}$ calculated based on the weight of the silicon and nanographite) which decreases to 603.1 mAh g$^{-1}$ after 30 cycles measured at the current density of 0.1 A g$^{-1}$. The capacity retention of SNGA/NG electrode is 57% for the 30$^{th}$ cycle. Comparing it with previous studies of pristine silicon, milled silicon and heat-treated silicon that show capacity retention of 33%, 32% and 52% respectively for 30$^{th}$ cycle measured at the current density of 0.1 A g$^{-1}$. Further for 100th cycle, the capacity retention for SNGA/NG is 52% while for pristine silicon, milled silicon and heat-treated silicon the capacity retention is 17%, 31% and 19% respectively.

Jiang et. al. (Free-Standing Si/Graphene Paper Using Si Nanoparticles Synthesized by Acid-Etching Al—Si Alloy Powder for High-Stability Li-Ion Battery Anodes. Electrochim. Acta 188, 777-784 (2016)) have synthesized Si nanoparticles (size ~ 10 nm) via acid-etching Al—Si alloy powder and further prepared the Si/GO paper followed by thermal reduction at 700° C. The electrochemical study reveals, the said electrode has capacity fade of 47% from initial capacity (3200 mAh g$^{-1}$ to 1500 mAh g$^{-1}$ for 3$^{rd}$ cycle). The capacity was calculated based on the weight of active silicon particles only. Based on these calculations, the SNGA/NG electrode, has capacity of 2365 mAh g$^{-1}$ after 100 cycles which is 58% higher than this report.[33] Lyu et. al. has prepared silicon-based gel in which Si core is covered with phytic acid shell layers through a facile high-energy ball milling method. The capacity was calculated based on the weight of active silicon particles. The gel-based electrode has the capacity of 1300 mAh g$^{-1}$ at 0.42 A g$^{-1}$ while SNGA/NG electrode has shown the capacity of 1915 mAh g$^{-1}$ at 0.5 A g$^{-1}$ after 50$^{th}$ cycle. which is 47% higher than gel electrode.

In comparison with the above results, SNGA/NG electrode prepared using micron sized silicon particles have shown much better specific capacity and capacity retention. SNGA is prepared by simple, scalable, and cost-efficient method as compared with the methods explained above. The specific energy of SNGA/NG electrode was found to be 787 Wh kg$^{-1}$ for the first cycle and for 200$^{th}$ cycle, the energy density was 341.25 Wh kg$^4$ which is significantly higher than commercial automotive batteries based on the Si anodes.

Conclusions

A simple, scalable, and cost-efficient method for the manufacturing of silicon nanoparticles attached to the nanographite flakes was studied and reported. The presence of silicon/silica nanoparticles attached to the nanographite flakes was confirmed from the SEM and TEM studies. The electrochemical measurements prove a stable specific capacity even at high current rates and good cyclic stability for aerogel-based electrodes. The electrodes show a specific capacity of 455 mAh g$^{-1}$ for 200$^{th}$ cycles with a coulombic efficiency of 97% at a current density of 100 mA g$^{-1}$. This performance is fully explained by the contribution of nanosilicon in the electrode. This electrode is made from a scalable and low-cost aerogel method. Electrode performance for 200$^{th}$ cycle i.e. 455 mAh g$^{-1}$ corresponds to 341 Wh kg$^{-1}$ which is higher value than currently reported best value of 260 Wh kg$^{-1}$ in literature.[41] Measured nanosilicon weight was 6.2% and matches closely to the expected weight calculated from electrochemical performance of 6.2%.

The invention claimed is:

1. A silicon-nanographite aerogel for use as an anode in a battery comprising a matrix of nanographite flakes consisting of a mixture of graphene, multilayer graphene and graphite nanoplatelets, and silicon nanoparticles having a diameter between 1 nm and 100 nm, whereby the silicon-nanographite aerogel has a three-dimensional structure with pores between the nanographite flakes, whereby the specific surface area accommodates a volume expansion of the

TABLE 1

Comparison of specific capacities based on expected and actual weight percentage of nanosilicon and nanographite

| No of cycles | Actual Specific capacity of the SNGA/NG electrode | Contribution from nanographite in specific capacity | Expected weight of nanosilicon | Expected contribution from nanosilicon in the specific capacity | Actual weight of nanosilicon | Contribution in the specific capacity based on the actual weight of nanosilicon |
|---|---|---|---|---|---|---|
| 30 | 603.1 mAh g$^{-1}$ | 238.7 mAh g$^{-1}$ | 10.41% | 364.4 mAh g$^{-1}$ | 6.2% | 217 mAh g$^{-1}$ |
| 200 | 455 mAh g$^{-1}$ | 238.7 mAh g$^{-1}$ | 6.2% | 217 mAh g$^{-1}$ | 6.2% | 217 mAh g$^{-1}$ |

From FIG. 6c, it is observed that for 30$^{th}$ cycle, the specific capacity of SNGA/NG and NG electrode is 603.1 mAh g$^{-1}$ and 310 mAh g$^{-1}$ respectively. Considering the weight percentage of nanographite in the SNGA/NG electrode, it contributes 238.7 mAh g$^{-1}$ in the total specific capacity of electrode while the expected contribution from nanosilicon in specific capacity is 364.4 mAh g$^{-1}$ implying the weight of nanosilicon in SNGA/NG electrode to be 10.41% (indicated in Table 1). The actual weight of nanosilicon is 6.2% while the expected value of 10.41% falls within upper bound of geometric standard deviation in weight of nanosilicon i.e. 12.4%. However, the decaying of capacity curve indicates this effect to come from the fracturing of the microparticles in the powder.

Analyzing further for 200$^{th}$ cycle, the specific capacity of SNGA electrode is 455 mAh g$^{-1}$, the expected contribution from nanosilicon in specific capacity is 218 mAh g$^{-1}$, which corresponds to 6.2% of weight percent of nanosilicon in the final electrode. The theoretical value of the weight percentage of nanosilicon (6.2%) matches closely with the actual calculated value of 6.2%. This implies that the specific capacity is mainly due to silicon nanoparticles.

silicon nanoparticles of at least 400% during lithiation, and wherein the surfaces of the nanographite flakes are 10 to 90% covered with nanoparticles of silicon.

2. A silicon-nanographite aerogel for use as an anode in a battery comprising a matrix of nanographite flakes consisting of a mixture of graphene, multilayer graphene and graphite nanoplatelets, and silicon nanoparticles having a diameter between 1 nm and 100 nm, whereby the silicon-nanographite aerogel has a three-dimensional structure with pores between the nanographite flakes, whereby the specific surface area accommodates a volume expansion of the silicon nanoparticles of at least 400% during lithiation, and wherein the silicon-nanographite aerogel has a specific surface area between 10 and 500 m$^2$/g as measured using a BET (Braunauer-Emmett-Teller).

3. The silicon-nanographite aerogel according to claim 1, wherein the surfaces of the nanographite flakes are 10 to 90% covered with nanoparticles of silicon and wherein the silicon-nanographite aerogel has a specific surface area between 10 and 500 m$^2$/g as measured using a BET (Braunauer-Emmett-Teller).

4. The silicon-nanographite aerogel according to claim 1, wherein the amount of silicon nanoparticles is at least 3 wt %, wherein wt % are weight percentages of the total weight of the silicon-nanographite aerogel.

5. The silicon-nanographite aerogel according to claim 1, whereby the weight ratio of nanographite to silicon is about 0.1 to 40:1.

6. The silicon-nanographite aerogel according to claim 1, wherein the nanographite flakes have a thickness between 0.34 nm and 100 nm and a length between 100 nm and 50 pm.

7. An electrode for use as an anode in a battery comprising the silicon-nanographite aerogel according to claim 1, and added untreated nanographite, and a binder.

8. The electrode according to claim 7, whereby the electrode has a specific capacity of 455 mAh/g after 50 to 200 cycles with a coulombic efficiency of 97% at a current density of 100 mA/g.

9. The electrode according to claim 7, whereby an electrical conductivity of the electrode is in the range of $2.5 \times 10^3$ kS/m to $10 \times 10^3$ kS/m.

10. A method for manufacturing the silicon-nanographite aerogel according to claim 1, comprising the steps of:
   1) dispersing the silicon nanoparticles in a water-soluble biodegradable, biocompatible, and nontoxic polymer solution,
   2) adding the nanographite flakes consisting of a mixture of graphene, multilayer graphene and graphite nanoplatelets,
   3) heating the silicon-nanographite aerogel to at least 500° C., in an inert atmosphere, thereby vaporizing the silicon nanoparticles,
   4) cooling the silicon-nanographite aerogel to room temperature, thereby condensing the silicon nanoparticles on the surfaces of the nanographite flakes,
   whereby the product obtained in step 4) is coated with carbon from vaporized carbon present in the polymer solution used in step 1).

11. The method according to claim 10, wherein the nanographite flakes have a thickness between 0.34 nm and 100 nm and a length between 100 nm and 50 pm.

12. The method according to claim 10, wherein the weight ratio of silicon to nanographite flakes is 0.1 to 40:1.

13. The method according to claim 10, wherein the condensed silicon nanoparticles have a diameter between 1 and 100 nm.

14. The silicon-nanographite aerogel according to claim 1, prepared by
   1) dispersing the silicon nanoparticles in a water-soluble biodegradable, biocompatible, and nontoxic polymer solution,
   2) adding the nanographite flakes consisting of a mixture of graphene, multilayer graphene and graphite nanoplatelets,
   3) heating the silicon-nanographite aerogel to at least 500° C., in an inert atmosphere, thereby vaporizing the silicon nanoparticles,
   4) cooling the silicon-nanographite aerogel to room temperature, thereby condensing the silicon nanoparticles on the surfaces of the nanographite flakes,
   whereby the product obtained in step 4) is coated with carbon from vaporized carbon present in the polymer solution used in step 1).

* * * * *